Aug. 2, 1932.   W. TIDEMAN   1,869,525
DAYLIGHT FILM VIEWING POCKET APPARATUS
Filed Aug. 29, 1927
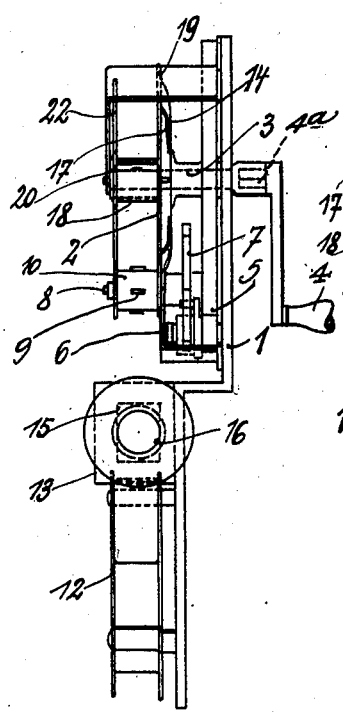
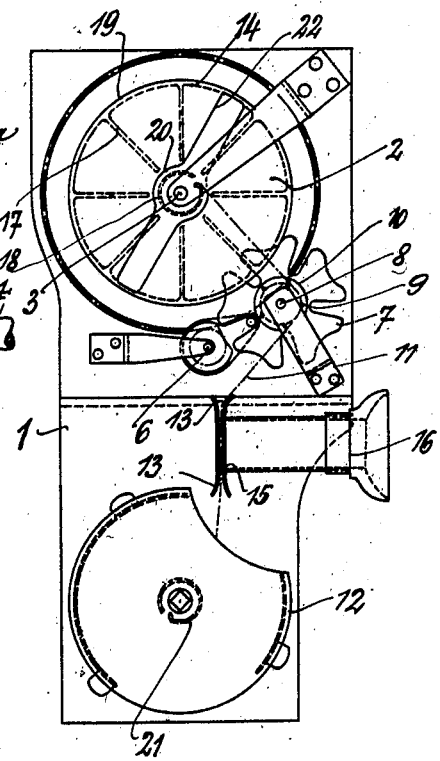
Inventor
Wilhelm Tideman Patented Aug. 2, 1932

1,869,525

UNITED STATES PATENT OFFICE

WILHELM TIDEMAN, OF BREMEN, GERMANY, ASSIGNOR OF ONE-HALF TO WALTHER GILDEMEISTER, OF BREMEN, GERMANY

DAYLIGHT FILM VIEWING POCKET APPARATUS

Application filed August 29, 1927, Serial No. 216,025, and in Germany March 22, 1927.

Applications for patent have been filed in Germany on 22nd March, 1927, and 22nd May, 1927.

This invention relates to an improved daylight film viewing pocket apparatus, which is distinguished from the known art by its very simple and cheap construction, the film being advanced in stepwise or intermittent fashion without the employment of cumbrous and expensive expedients; the improvements consisting particularly in certain constructional details of the apparatus.

The accompanying drawing illustrates the improved apparatus: Figs. 1 and 2 are respectively a front view and a side view of a preferred form of the same.

As shown in Figs. 1 and 2, the apparatus is constructed for viewing narrow films having pictures of comparatively small height only. To this end, on a base or frame plate 1 a rotary shaft 3, which carries the loose film reception drum 2, is mounted and provided with a square cavity for attaching a detachable handle 4 thereto. By means of a toothed gearing 5 the one-pawl spindle 6 in gear with a star-wheel 7 is rotated from the driving shaft 3, the axle 8 of said star-wheel carrying the feed wheel or roll 10 with tappets 9 thereon. The film 11 is unwound from the film box 12 and led through the fixed guide 13 on the base plate 1, said guide having funnel-shaped rounded ends 13a and an opening 15 therein, in front of which, and facing it, the viewing funnel 16 with the magnifying lens is located. The guide 13, as shown, has a lateral entranceway, allowing the film to be inserted or removed at one side of the machine, and the feed wheel 10 is constructed and arranged to permit the film to be moved from one side of said wheel into or out of engagement with the feed surface of said wheel. The tappets 9, of which a plurality, at least four, are provided on the feed wheel or roll 10, engage in the ordinary slots or perforations of the film and thereby advance the latter, at least two of said tappets being always in engagement with the film to ensure a reliable guiding and advance of the latter. By the one-pawl spindle and star-wheel gearing 6, 7 the advance of the film takes place in a step-like or intermittent manner, while the driving of the loose film reception drum 2 on the shaft 3 takes place by means of a sliding spring 14. The latter is, for instance, formed of a concave disc mounted on the shaft 3 and having radial incisions 17 therein. The film reception drum 2 consists of a boss 18 carrying thereon a large inner disc 19, against which bears the sliding spring 14, and a small outer disc 20, which latter is fitted with a diametral arm 22 for ensuring a reliable guiding of the film during its winding-up on the drum, though permittitng its inspection from outside. Said arm 22 allows further an easy access to the interior of the drum 2 for attaching thereto the film end by means of a hook-and-eye fastening or the like known in the art. The sliding spring 14 in contact with the rear disc 19 of the film reception drum 2 allows a sliding rotation of the latter even with increasing diameter of the wound-up film. The film box 12 is detachably mounted on a hollow axle 21 having a square cavity therein for an attachment of the detachable crank-handle 4 thereto if it is desired to return the wound-up film from the film reception drum 2 to the film box 12, for which purpose the film must of course be raised from the tappet roll 9, 10.

The one-pawl and star-wheel gear 6, 7 permits of the film being advanced for a short time only comparatively to its standstill, the proportion in the example being about 1:2, though the same can be chosen still larger.

As shown, the frame plate 1 has an upper portion supporting the drum 2, shaft 3, feed wheel 10 and the spring 14 and drive gearing for operating the wheel 10, and a lower portion supporting the film box 12, guide 13 and funnel 16, said upper and lower portions of the frame plate being connected by an intermediate laterally bent portion which offsets the lower portion of the frame plate from the vertical plane of the upper portion of the frame plate. By this construction the parts 12, 13 and 16 mounted on the lower frame portion are brought to lie below and in the plane of the drum 2 and feed wheel 10 for coaction therewith, this arrangement allowing the parts 2 and 10 to be so disposed and the spring 14 and drive gearing to be properly mounted therewith on the upper frame portion in a compact manner, and whereby a one-piece type of frame construction, as shown, may be employed, if desired.

What I claim is:—

1. In a film viewing apparatus, the combination of a revolubly mounted driving shaft, a film reception drum loosely mounted on said shaft, a transverse spring mounted on said shaft and in contact with said drum, a star wheel, a revolubly mounted one-pawl spindle in gear with said driving shaft and in intermittent gear with said star wheel, a tappet roll, a revolubly mounted axle carrying said star wheel and tappet roll, a film box, a revolubly mounted axle on which said film box is mounted, a fixed film guide located between said film box and said tappet roll and having an opening therein to expose the film, a viewing device in line with said opening, and a common base plate having a portion on which said driving shaft, said axles, and said one-pawl spindle are mounted, and a portion on which said fixed guide and film box are mounted, said portions being relatively offset so as to lie in different vertical planes.

2. In a film viewing apparatus, a base, a driving shaft, a reception drum revolubly mounted thereon, said drum having a boss loosely mounted on said driving shaft, a sliding spring carried by the shaft, a large rear disc thereon in contact with said sliding spring, a small front disc on said boss, a film-guiding arm on said latter disc comprising diametrically projecting portions arranged to permit an inspection of and an easy access to the interior of the drum, a film box revolubly mounted on the drum, said drum and film box having means for the application thereto of means for interchangeably driving the same for feeding the film from one to the other, an intermittent feed mechanism including a feed wheel for engagement with the film to feed the same from the film box to the drum, and a guide device between the film box and the drum for guiding the film in its travel, said guide device being open at one side to permit the film being laterally insertable into and removable from said guide device and laterally movable into and out of a position for radial engagement with and disengagement from the feed wheel for intermittent or continuous driving actions respectively in its feed from the film box to the drum and vice versa.

In testimony whereof I have hereunto set my hand.

WILHELM TIDEMAN.